United States Patent Office 3,314,977
Patented Apr. 18, 1967

3,314,977
OPTIONALLY 17α-ALKYLATED 3-OXYGENATED 2α-DIALKYLAMINOMETHYL-5α-ANDROSTAN-17β-OLS AND ESTERS THEREOF
Raymond E. Counsell, Skokie, Ill., assignor to G. D. Searle & Co., Chicago, Ill., a corporation of Delaware
No Drawing. Filed June 18, 1962, Ser. No. 203,015
10 Claims. (Cl. 260—397.4)

This application is a continuation-in-part of my copending application, Ser. No. 54,601 filed Sept. 8, 1960, now U.S. Patent No. 3,105,841.

The present invention is concerned with novel dialkylaminomethyl steroids of the androstane series and, more particularly, with compounds of the structural formula

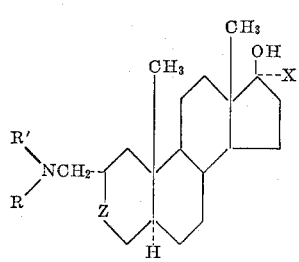

wherein R and R' are lower alkyl radicals, X is hydrogen or a lower alkyl radical, Y is hydrogen or a lower alkanoyl radical, and Z can be a carbonyl, hydroxymethylene, or (lower alkanoyl)oxymethylene radical.

Representative of the lower alkyl radicals designated in the foregoing structural formula are, typically, methyl, ethyl, propyl, butyl, pentyl, hexyl, and the branched-chain isomers thereof. The lower alkanoyl radicals indicated in that structural representation are exemplified by formyl, acetyl, propionyl, butyryl, valeryl, caproyl, and the branched-chain radicals isomeric therewith.

The compounds of this invention are conveniently manufactured from starting material of the structural formula

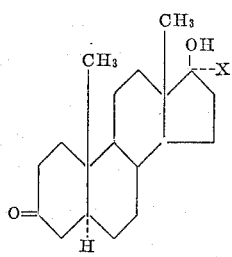

wherein X is hydrogen or a lower alkyl radical. These materials are allowed to react with formaldehyde and an aliphatic secondary amine, suitably in the form of its hydrochloride, to afford the instant amine salts, which are converted to the organic bases of this invention, typically by reaction with an inorganic alkali. These processes are illustrated by the following sequence of reactions:

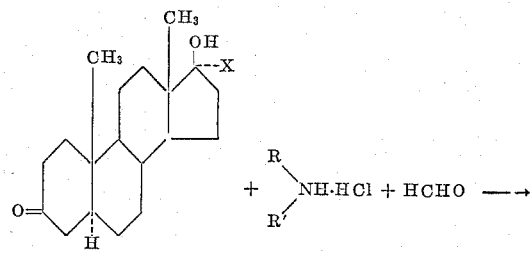

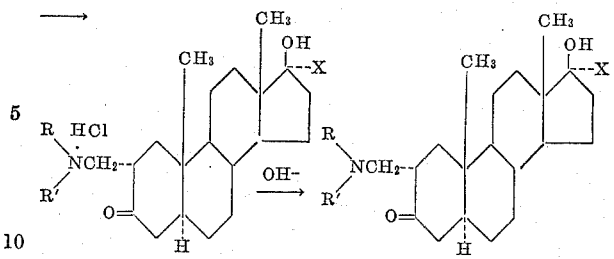

A specific example of these processes is the preparation of 17β-hydroxy-17α-methyl-2α-dimethylaminomethyl-5α-androstan-3-one by the reaction of 17β-hydroxy-17α-methyl-5α-androstan-3-one with formaldehyde and dimethylamine hydrochloride, followed by neutralization with aqueous sodium carbonate.

The 3-hydroxy compounds of the present invention can be obtained by allowing the aforementioned 3-keto compounds to react with a suitable reducing agent. Examples of such reagents are tri-(tertiary-butoxy) lithium aluminum hydride, lithium aluminum hydride, and sodium borohydride. Alternatively, this reduction can be effected by catalytic hydrogenation in the presence of such catalysts as palladium, nickel, or platinum oxide. Typically, 17β-hydroxy-17α-methyl-2α-dimethylaminomethyl-5α-androstan-3-one in tetrahydrofuran is contacted with tri-(tertiary-butoxy) lithium aluminum hydride at low temperature to produce 17α-methyl-2α-dimethylaminomethyl-5α-androstane-3β,17β-diol. Catalytic reduction of the latter 3-keto compound at elevated temperature and high pressure in the presence of 5% palladium-on-barium sulfate catalyst affords the latter 3β,17β-diol together with the epimeric 3α,17β-diol, while hydrogenation at room temperature and atmospheric pressure, utilizing a 5% palladium-on-carbon catalyst, produces the 3β,17β-diol.

The alkanoyloxy compounds of the present invention can be manufactured by esterification of the aforementioned hydroxy compounds. As a specific example, 17α-methyl-2α-dimethylaminomethyl-5α-androstane-3β,17β-diol is contacted with acetic anhydride in the presence of triethylamine to afford 17α-methyl-2α-dimethylaminomethyl-5α-androstane-3β,17β-diol 3-acetate. Similarly, 2α-dimethylaminomethyl-5α-androstane-3β,17β-diol is allowed to react with acetic anhydride in pyridine at ordinary temperature to yield 2α-dimethylaminomethyl-5α-androstane-3β,17β-diol 3,17-diacetate.

The compounds of the present invention display valuable pharmacological properties. They are, for example, hormonal and anti-hormonal agents as is evidenced by their anabolic, androgenic, and anti-estrogenic activity. In addition, they are anti-atherogenic agents as is demonstrated by their inhibitory effect on the hepatic synthesis of cholesterol. They possess also antibiotic activity, being particularly effective against the bacterium *Diplococcus pneumoniae*.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

*Example 1*

To a solution of 15 parts of 17β-hydroxy-17α-methyl-5α-androstan-3-one and 25 parts of dimethylamine hydrochloride in 103 parts of ethanol is added 21 parts of 38% aqueous formaldehyde, and the resulting mixture is heated at reflux for about 2 hours, then is stored at room temperature for about 15 hours. The reaction mixture is acidified by the addition of approximately 200 parts of dilute hydrochloric acid, then is further diluted with 500 parts of water. This aqueous mixture is extracted with ether, then is cooled by the addition of ice and made alkaline by means of aqueous sodium carbonate. The resulting precipitate is collected by filtration, washed with water, then recrystallized from ethyl acetate to afford needle-like crystals of 17β-hydroxy-17α-methyl-2α-dimethylaminomethyl-5α-androstan-3-one, M.P. about 161–163°; $[\alpha]_D = -33°$ (chloroform). This substance displays infrared maxima at about 2.74, 3.38, 3.58, 5.83, 6.85, 7.22, and 10.72 microns and is represented by the structural formula

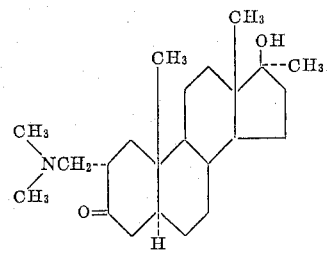

The substitution of an equivalent quantity of diethylamine hydrochloride in the process of this example results in 2α - diethylaminomethyl - 17β - hydroxy - 17α - methyl-5α-androstan-3-one.

*Example 2*

By substituting 14.4 parts of 17β-hydroxy-5α-androstan-3-one and otherwise proceeding according to the processes of Example 1, 17β-hydroxy-2α-dimethylaminomethyl-5α-androstan-3-one is obtained. This substance displays a double melting point at 154–157° and 225–245° and is further characterized by an optical rotation of −15° and infrared maxima at about 2.74, 3.38, 3.58, 5.82, 7.20, 9.60, and 9.85 microns. It is represented by the structural formula

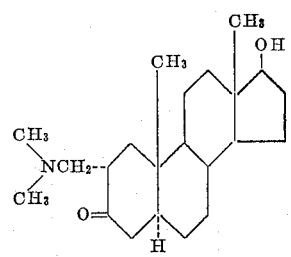

*Example 3*

The substitution of 15.8 parts of 17α-ethyl-17β-hydroxy-5α-androstan-3-one in the process of Example 1 results in 17α - ethyl - 17β - hydroxy - 2α - dimethylaminomethyl-5α-androstan-3-one, which compound is obtained as an oil. A solution of this amine in ether is treated with isopropanolic hydrogen chloride, and the resulting precipitate is recrystallized from ethanol-acetone to afford the corresponding amine hydrochloride, M.P. about 203–205° (decomposition).

*Example 4*

By substituting 14.4 parts of 17β-hydroxy-5α-androstan-3-one and 33.6 parts of diethylamine hydrochloride in the process of Example 1, 2α-diethylaminomethyl-17β-hydroxy-5α-androstan-3-one is obtained.

*Example 5*

To a solution of 20 parts of 17β-hydroxy-17α-methyl-2α-dimethylaminomethyl-5α-androstan-3-one in 266 parts of tetrahydrofuran, cooled to 0–5°, is added with stirring a cooled solution of 45 parts of tri-(tertiary-butoxy) lithium aluminum hydride in 266 parts of tetrahydrofuran. This reaction mixture is then stirred for about 20 minutes longer, while it is allowed to warm gradually to room temperature. It is then poured into about 3500 parts of a mixture of ice and water containing 210 parts of glacial acetic acid. The resulting aqueous solution is washed with ether, then is made alkaline by the addition of concentrated aqueous sodium carbonate, and is finally extracted with chloroform. The organic layer is separated, washed with water, dried over anhydrous potassium carbonate containing decolorizing carbon, then is stripped of solvent at reduced pressure to afford a white solid residue. Recrystallization of this residue from acetone produces pure 17α-methyl-2α-dimethylaminomethyl-5α-androstane-3β,17β-diol, which melts at about 235–236.5°; $[\alpha]_D = +7°$ (chloroform). It is characterized further by the structural formula

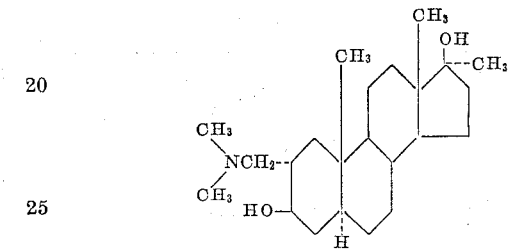

A solution of 17α-methyl-2α-dimethylaminomethyl-5α-androstane-3β,17β-diol in a 1:1 mixture of ether and acetone is made acidic by the addition of isopropanolic hydrogen chloride. The resulting precipitate is collected by filtration and washed with an ether-hexane mixture to yield the pure corresponding hydrochloride.

*Example 6*

A mixture of 4 parts of 17α-methyl-2α-dimethylaminomethyl-5α-androstane-3β,17β-diol, 21.6 parts of acetic anhydride, and 11 parts of triethylamine is stirred at room temperature for about 16 hours, then is poured into approximately 125 parts of water. The resulting aqueous mixture is cooled and is made alkaline by the addition of 5% aqueous sodium carbonate. The resulting precipitate is collected by filtration, washed on the filter with water, and dried in air. Recrystallization from aqueous methanol results in pure 3β-acetoxy-17α-methyl-2α-dimethylaminomethyl-5α-androstan-17β-ol, M.P. about 220–224° (dec.). It is characterized further by an optical rotation in chloroform of −69° and by the structural formula

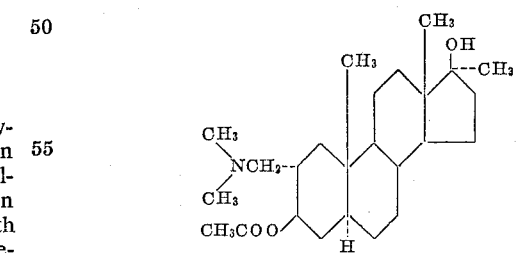

*Example 7*

To a solution of 3.63 parts of 17β-hydroxy-17α-methyl-2α-dimethylaminomethyl-5α-androstan-3-one in 50 parts of dioxane is added 0.36 part of 5% palladium-on-barium sulfate catalyst, and this reaction mixture is shaken in a hydrogen atmosphere at a pressure of 1030–1100 pounds per square inch and at a temperature of 130° until the uptake of hydrogen ceases. The catalyst is removed by filtration and the filtrate is poured slowly into a mixture of ice and water with stirring. The resulting precipitate is collected by filtration, then is dissolved in benzene, and the benzene solution is adsorbed on an alumina chromatographic column. The column is then developed with benzene solutions containing increasing proportions of ethyl acetate and finally with pure ethyl acetate. Evaporation of the 100% ethyl acetate eluate to dryness affords a residue which is recrystallized from ethyl acetate-heptane to afford 17α-methyl-2α-dimethylaminomethyl-5α-androstane-3α,17β-diol, which melts at about 171.5-173°. It is further characterized by the structural formula

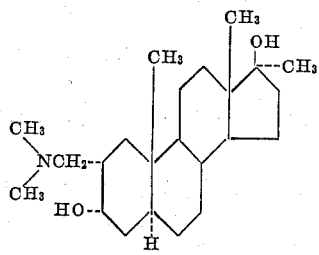

The 25% ethyl acetate in benzene eluate is evaporated to dryness and the residue is dissolved in a mixture of methanol and ether, is shaken with decolorizing carbon, then is recrystallized from methanol-ethyl acetate. The resulting material is washed on the filter with ether, then is dried to yield 17α-methyl-2α-dimethylaminomethyl-5α-androstane-3β,17β-diol, which substance melts at about 232.5–234.5°, and is identical with the compound obtained in Example 5. This substance displays an optical rotation of +7° in chloroform and is represented by the structural formula

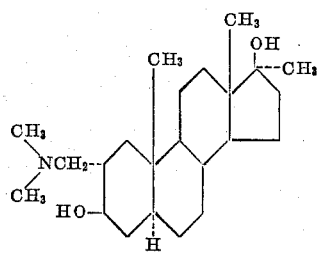

Example 8

A mixture of one part of 17β-hydroxy-17α-methyl-2α-dimethylaminomethyl-5α-androstan-3-one, 24 parts of ethanol, 0.01 part of potassium hydroxide and 0.1 part of 5% palladium-on-carbon catalyst is shaken with hydrogen at atmospheric pressure and room temperature until the theoretical quantity of hydrogen is absorbed. Removal of the catalyst by filtration affords a filtrate which is concentrated to a small volume, then is diluted with water and cooled. The resulting crystalline material is collected by filtration and dried to afford 17α-methyl - 2α - dimethylaminomethyl - 5α - androstane-3β,17β-diol, M.P. about 223-227° (dec.) Further recrystallization from methanol-ethyl acetate yields a pure sample melting at about 232.5–234.5°, identical with the compound produced in Examples 5 and 7.

Example 9

A mixture of 3.5 parts of 2α-dimethylaminomethyl-5α-androstane-3β,17β-diol, 5 parts of acetic anhydride and 35 parts of pyridine is stored at room temperature for about 16 hours, then is poured into approximately 75 parts of a mixture of ice and water. The resulting aqueous mixture is made alkaline by the dropwise addition of 4 N aqueous sodium hydroxide, and the resulting precipitate is collected by filtration then is washed on the filter with water and dried to yield 2α-dimethylaminomethyl-5α-androstane-3β,17β-diol 3,17-diacetate, which compound displays a double melting point of 96–99° and 117–121°. Recrystallization of this material first from aqueous acetone, then from pentane yields a pure sample melting at about 127–128.5°. It is characterized further by the structural formula

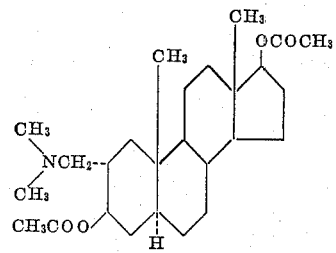

Example 10

A solution of one part of 2α-dimethylaminomethyl-5α-androstane-3β,17β-diol 3,17-diacetate in anhydrous ether is mixed with sufficieint isopropanolic hydrogen chloride to make the mixture acidic. The resulting precipitate is collected by filtration, then is recrysallized from a mixture of acetone, ethyl acetate and ether to afford 2α-dimethylaminomethyl-5α-androstane-3β,17β-diol 3,17-diacetate hydrochloride, which substance melts at about 215–220° (dec.).

Example 11

By substituting 20.8 parts of 17α-ethyl-17β-hydroxy-2α-dimethylaminomethyl-5α-androstan-3-one and otherwise proceeding according to the processes of Example 5, 17α-ethyl - 2α - dimethylaminomethyl - 5α - androstane-3β,17β-diol of the structural formula

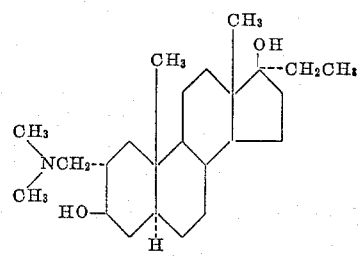

is obtained.

Example 12

The substitution of 21.5 parts of 2α-diethyl-aminomethyl-17β-hydroxy-5α-androstan-3-one in the procedure of Example 5, results in 2α-diethylaminomethyl-5α-androstane-3β,17β-diol of the structural formula

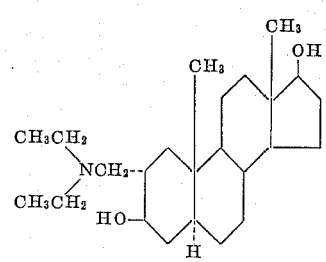

What is claimed is:

1. 2α - dimethylaminomethyl - 5α - androstane - 3β, 17β-diol 3,17-diacetate.
2. 2α - dimethylaminomethyl - 17α - methyl - 5α-androstane-3β,17β-diol 3-acetate.
3. A compound of the structural formula

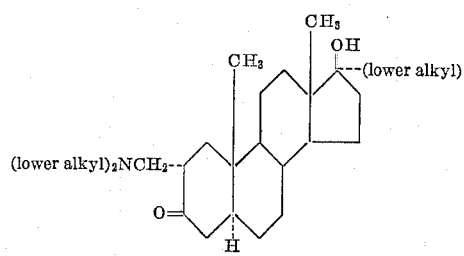

4. 17β - hydroxy - 17α - methyl - 2α - dimethylaminomethyl-5α-androstan-3-one.

5. 17α - ethyl - 17β - hydroxy - 2α - dimethylaminomethyl-5α-androstan-3-one.

6. A compound of the structural formula

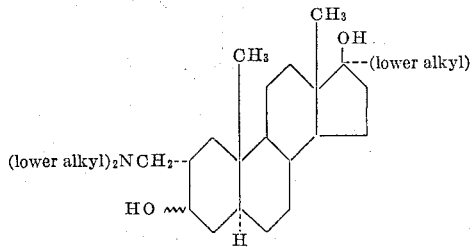

7. 2α - dimethylaminomethyl - 17α - methyl - 5α - androstane-3β,17β-diol.

8. 2α - dimethylaminomethyl - 17α - methyl - 5α - androstane-3α,17β-diol.

9. A compound of the structural formula

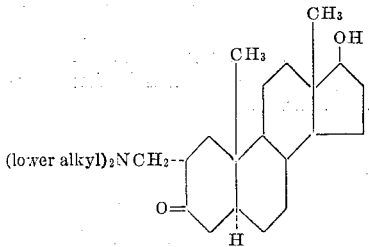

10. 17β - hydroxy- 2α - dimethylaminomethyl - 5α-androstan-3-one.

References Cited by the Examiner
UNITED STATES PATENTS
3,092,621   6/1963   DeStevens _____ 260—239.5

ELBERT L. ROBERTS, *Primary Examiner.*